US011119978B2

(12) United States Patent
Zacks et al.

(10) Patent No.: US 11,119,978 B2
(45) Date of Patent: Sep. 14, 2021

(54) SNAPSHOT VERSION CONTROL

(71) Applicant: Red Hat Israel, Ltd., Raanana (IL)

(72) Inventors: Simcha Zacks, Ma'alot (IL); Oded Ramraz, Hadera (IL); Ilia Meerovich, Haifa (IL)

(73) Assignee: RED HAT ISRAEL, LTD., Raanana (IL)

( * ) Notice: Subject to any disclaimer, the term of this patent is extended or adjusted under 35 U.S.C. 154(b) by 134 days.

(21) Appl. No.: 15/176,299

(22) Filed: Jun. 8, 2016

(65) Prior Publication Data

US 2017/0357551 A1    Dec. 14, 2017

(51) Int. Cl.
*G06F 16/00* (2019.01)
*G06F 16/11* (2019.01)
*G06F 11/14* (2006.01)

(52) U.S. Cl.
CPC ........ *G06F 16/128* (2019.01); *G06F 11/1448* (2013.01)

(58) Field of Classification Search
CPC ............................ G06F 16/128; G06F 11/1448
See application file for complete search history.

(56) References Cited

U.S. PATENT DOCUMENTS

| 7,165,079 | B1 * | 1/2007 | Chen .................. G06F 16/10 |
| 7,680,836 | B2 | 3/2010 | Anderson et al. |
| 8,055,864 | B2 | 11/2011 | Sawdon et al. |
| 8,204,860 | B1 * | 6/2012 | Ferguson .......... G06F 17/30088 707/639 |
| 8,386,428 | B2 | 2/2013 | Kuznetzov et al. |
| 8,510,524 | B1 * | 8/2013 | Corbett ............. G06F 17/30088 707/639 |
| 8,527,947 | B2 | 9/2013 | Clemm |
| 8,549,051 | B2 | 10/2013 | Ahrens et al. |
| 8,935,206 | B2 | 1/2015 | Aguilera et al. |
| 8,959,055 | B1 | 2/2015 | Koryakina et al. |
| 9,015,123 | B1 * | 4/2015 | Mathew ............ G06F 17/30174 707/646 |

(Continued)

FOREIGN PATENT DOCUMENTS

WO    WO 2010/050943 A1    5/2010

OTHER PUBLICATIONS

"Various Versioning & Snapshot FileSystems" http://www.cs.utah.edu/~shanth/stuff/research/version_fs/matrix.pdf, accessed May 6, 2016, 5 pages.

(Continued)

*Primary Examiner* — Paul Kim
(74) *Attorney, Agent, or Firm* — Haynes and Boone, LLP (57) ABSTRACT

Methods, systems, and computer program products are included for providing snapshot version control. A method includes creating a snapshot corresponding to a file system at a first point in time. After creating the snapshot, a file management data structure of the file system is modified corresponding to a file creation, deletion, or modification. The modified file management data structure is compared to the snapshot to identify differences between the snapshot and the file management data structure. A user may select one or more of the identified differences for merging the selected differences from the snapshot to the file management data structure or from the file management data structure to the snapshot.

20 Claims, 4 Drawing Sheets

(56) References Cited

U.S. PATENT DOCUMENTS

| | | | |
|---|---|---|---|
| 2007/0022117 A1 | 1/2007 | Keohane et al. | |
| 2008/0114951 A1* | 5/2008 | Lee | G06F 11/1469 |
| | | | 711/162 |
| 2012/0310875 A1 | 12/2012 | Prahlad et al. | |
| 2013/0054530 A1* | 2/2013 | Baker | G06F 16/119 |
| | | | 707/639 |
| 2013/0325824 A1* | 12/2013 | Shoens | G06F 17/30115 |
| | | | 707/698 |

OTHER PUBLICATIONS

"Can I "branch" VirtualBox Snapshots (Base Multiple VM on the Same Disk Image + Separate Diffs)?" http://superuser.com/questions/75500/can-i-branch-virtualbox-snapshots-base-multiple-vm-on-the-same-disk-image-s, accessed May 6, 2016, 2 pages.

* cited by examiner

SNAPSHOT VERSION CONTROL

FIELD OF DISCLOSURE

The present disclosure generally relates to electrical computers and digital data processing, and more particularly to file systems.

BACKGROUND

Traditional computing systems typically include file systems that organize data for storage and retrieval from memory. File systems generally store data in units such as files, which are organized into a directory hierarchy. Files may thus be associated with directories to logically organize the files relative to particular directories and other files. Files systems may also associate metadata with files and directories. This metadata may include file names, file sizes, timestamps, access permissions, and various other types of relevant file information. There are many different file system standards, but some common file system standards include EXT3, EXT4, FAT32, ISO 9660, NFTS, and XFS.

In traditional computing systems, file systems may support snapshot capabilities. A snapshot capability may be used to take a snapshot of a computing state of a file system at a particular point in time. The snapshot represents a backup of data from the file system. Accordingly, the backup of the file system reflects a state of the file system at the point in time when the snapshot was taken. For example, taking a snapshot may include storing a copy of directories, files, and file metadata in another location on the file system. The backup of the file system that is stored in the snapshot may be later restored to recover corrupted or lost data in the active file system.

Examples of the present disclosure and their advantages are best understood by referring to the detailed description that follows.

DETAILED DESCRIPTION

In the following description, specific details are set forth describing some examples consistent with the present disclosure. It will be apparent, however, to one skilled in the art that some examples may be practiced without some or all of these specific details. The specific examples disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one example may be incorporated into other examples unless specifically described otherwise or if the one or more features would make an example non-functional.

Various examples described herein provide techniques for identifying differences between a file system and a snapshot, and selectively merging the differences from the snapshot to the file system and/or from the file system to the snapshot. Snapshots of a file system may be taken by copying a file management data structure that is provided by the file system. This file management data structure may include an active file table, which provides pointers to files in the file system. Differences between the file system and a snapshot are identified by comparing the file management data structure to a snapshot. These differences may correspond to file or directory entries that (1) exist in the snapshot that do not exist in the file management data structure, (2) exist in the file management data structure that do not exist in the snapshot, and/or (3) exist on both the snapshot and the file management data structure, but have been modified in some way. Users may cherry-pick particular differences (or select all differences) to merge from a snapshot to a file management data structure or from the file management data structure to a snapshot.

These techniques are beneficial and advantageous for restoring corrupted or lost data from earlier points in time prior to the corruption or loss the data. Lost and corrupted data may cause computing systems to crash or experience other faults. Accordingly, the techniques described herein address these issues that are particular to computing systems by providing improved and more efficient snapshot techniques. These techniques are improved from traditional snapshot techniques in many ways. For example, unlike traditional snapshot techniques that do not identify differences between snapshots and the active file system, the techniques described herein identify differences between a snapshot and the active file system and allow users to select particular differences to merge from the snapshot to the active file system and/or from the active file system to the snapshot. Of course, it is understood that these features and advantages are shared among the various examples herein and that no one feature or advantage is required for any particular example.

Figure 1:
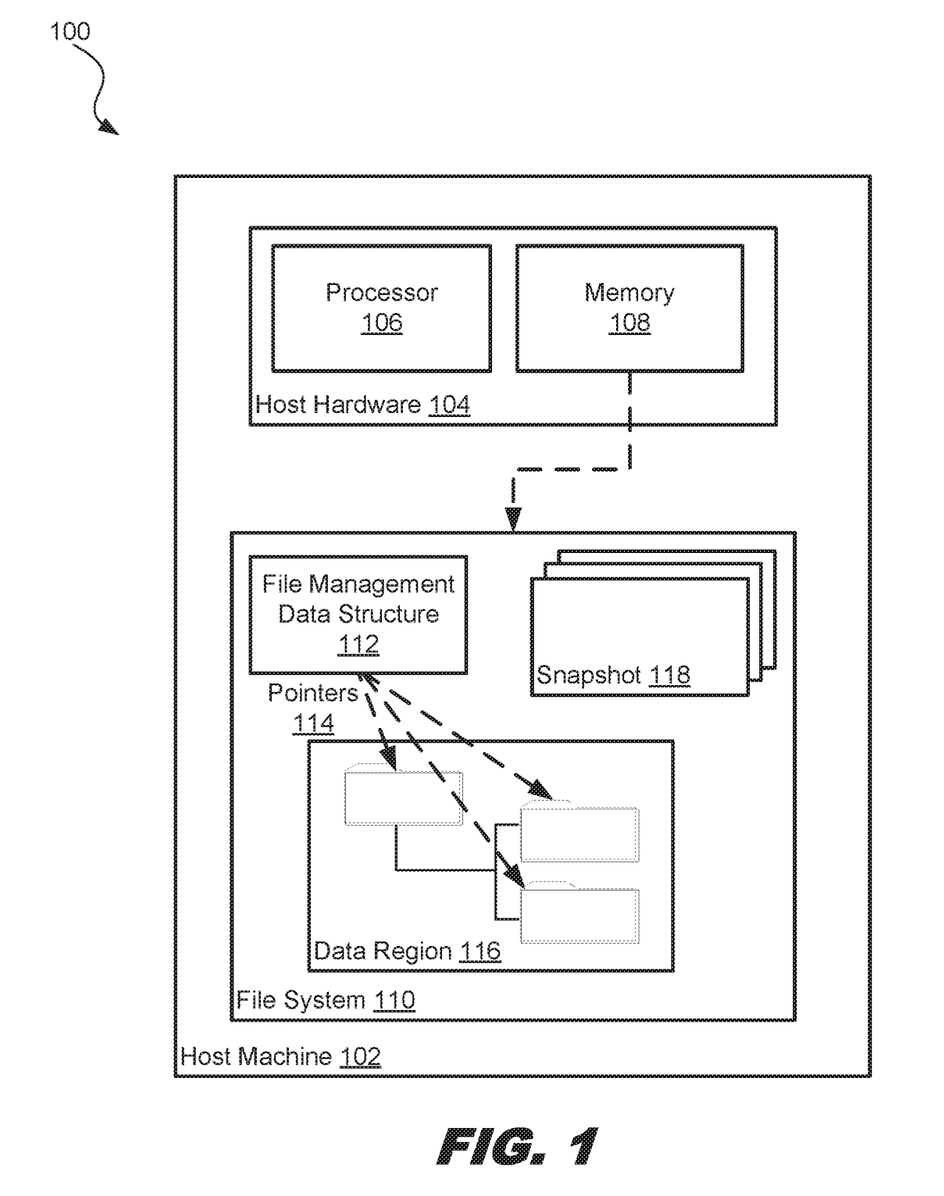
FIG. 1 is an organizational diagram illustrating a computing system that provides a file system with snapshot capabilities, in accordance with various examples of the present disclosure.

FIG. 1 is an organizational diagram illustrating a computing system 100 that provides a file system with snapshot capabilities, in accordance with various examples of the present disclosure.

The system 100 includes a host machine 102. The host machine 102 may include a personal computer (PC), tablet PC, rack mount computer, cellular telephone, web appliance, server, network router, switch or bridge, or any machine capable of executing a set of instructions (sequential or otherwise) that specify actions to be taken by that machine. Further, while a single host machine is illustrated, the term "machine" shall also be taken to include any collection of machines that individually or jointly execute a set (or multiple sets) of instructions to perform any one or more of the methodologies discussed herein. For example, a collection of machines may be communicatively coupled via one or more network devices and/or transport media.

The host machine 102 includes host hardware 104. Host hardware 104 includes physical elements such as a processor 106 and a memory 108. While one of each of these elements is illustrated for the purposes of simplicity, in some examples more than one of each of these hardware elements may be included. For example, the host hardware 104 may include a plurality of processors as well as various types of memory and other hardware devices.

Examples of other host hardware devices include, for example, a network interface card, wireless adapter card, audio/sound card, graphics card, storage adapter, a video display unit (e.g., a liquid crystal display (LCD) monitor), alphanumeric input device (e.g., a keyboard), cursor control device (e.g., a mouse), signal generation device (e.g., a speaker), and so forth. Host hardware 104 devices may be coupled via one or more buses (e.g., a PCI bus) and/or integrated into a motherboard provided by the host hardware 104.

In the present example, the processor 106 is structured to include one or more general-purpose processing devices such as a microprocessor, central processing unit, and the like. More particularly, the processor 106 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some examples, the processor 106 is structured to include one or more special-purpose processing devices such as an application specific integrated circuit (ASIC), a field programmable gate array (FPGA), a digital signal processor (DSP), network processor, and so forth. The processor 106 executes instructions read from the memory 108 to perform the operations, steps, and actions discussed herein.

In the present example, the memory 108 is structured to include at least one computer-readable storage medium, such as a non-transitory computer-readable storage medium, on which is stored one or more sets of instructions (e.g., software) embodying any one or more of the methodologies or functions described herein. The memory 108 may be structured to include one or more of a read-only memory (ROM), flash memory, dynamic random access memory (DRAM) such as synchronous DRAM (SDRAM), double data rate (DDR SDRAM), or DRAM (RDRAM), and so forth), static memory (e.g., flash memory, static random access memory (SRAM), and so forth), and a data storage device (e.g., a hard disk drive (HDD), solid state drive (SSD), and so forth).

In the present example, the memory 108 stores a file system 110. The file system 110 includes a file management data structure 112 that is structured with one or more tables, trees and/or other data structures that store information that organizes content stored in the data region 116. For example, the file management data structure 112 may include an active file table that includes file entries for the files stored in the data region 116.

In the present example, the file entries of the file management data structure 112 include pointers 114 to the memory addresses in the data region 116 where files are stored. File entries in the file management data structure 112 may also store file names, file attributes, and other file metadata. For example, file attributes for each file may include information corresponding to file permissions (e.g., read/write/execute access), file ownership, file size, file creation time, file modification time, and/or the most recent file access time.

The file management data structure 112 may also store information corresponding to directories that is similar to the information stored for files. For example, the file management data structure 112 may store directory names, ownership information, permissions information, and other attributes corresponding to directories. The file management data structure 112 may also provide pointers to locations in the data region 116 where directories are stored. The directories may be used to organize other directories and files into a hierarchy. In some examples, the file management data structure 112 includes one or more tree or table data structures that store information that describes the relative locations of files and directories with respect to other files and directories, such that the files and directories may be ordered into the hierarchy. For example, a tree that is included in a file management data structure 112 may include a root parent directory that includes branches for child directories and files. The child directories may further include additional sub-directories and files.

The data region 116 is structured to store the data content of the files and directories. For example, the memory may be divided into units such as clusters, logical sectors, physical sectors, sector offsets, or other data units that are used to store portions of data corresponding to the files. The pointers 114 included in the file management data structure 112 specify memory addresses corresponding to the files so that the files may be accessed. For example, a file entry for a particular file in the file management data structure 112 may include a pointer that specifies a start address corresponding to the particular file in the data region 116.

In the present example, the file management data structure 112 is updated to create, delete, and modify files that are stored in the data region 116. Accordingly, at a particular point in time, the file management data structure 112 reflects the state of the file system at that particular point in time. The computing system 100 may delete a file by removing a pointer corresponding to the file from the file management data structure 112, while leaving intact the content of the file in the data region 116. The computing system 100 may create a file by creating a file entry in the file management data structure 112, adding a pointer to a location in the data region 116 where the file is stored, and modifying the memory at the location in the data region 116 to store the content of the file. The computing system 100 may modify an existing file by changing pointers and/or metadata stored in the file management data structure 112 to insert the modifications. For example, if a file is moved, its file pointer may be updated in the file management data structure 112 to reference the new location of the file in the data region 116. In another example, a timestamp associated with the file may be updated in the file management data structure 112 to indicate a new modification time. In yet another example, a file size may be modified in the file management data structure 112 to identify an increased size of a file that has been edited to include additional content in the data region 116.

In the present example, the file system 110 stores one or more snapshots 118. Each snapshot represents a copy of information from the file management data structure 112 at the particular point in time when the snapshot was taken. This information may include all of the information from the file management data structure 112 or a portion of the information. Portions of the information from the file management data structure 112 that may be copied to a snapshot may include, for example, pointers corresponding to the files stored in the data region 116. Each snapshot may further be structured to include metadata describing the content of the snapshot, such as a version identifier and/or timestamp corresponding to the time/date when the snapshot was taken.

Figure 2:
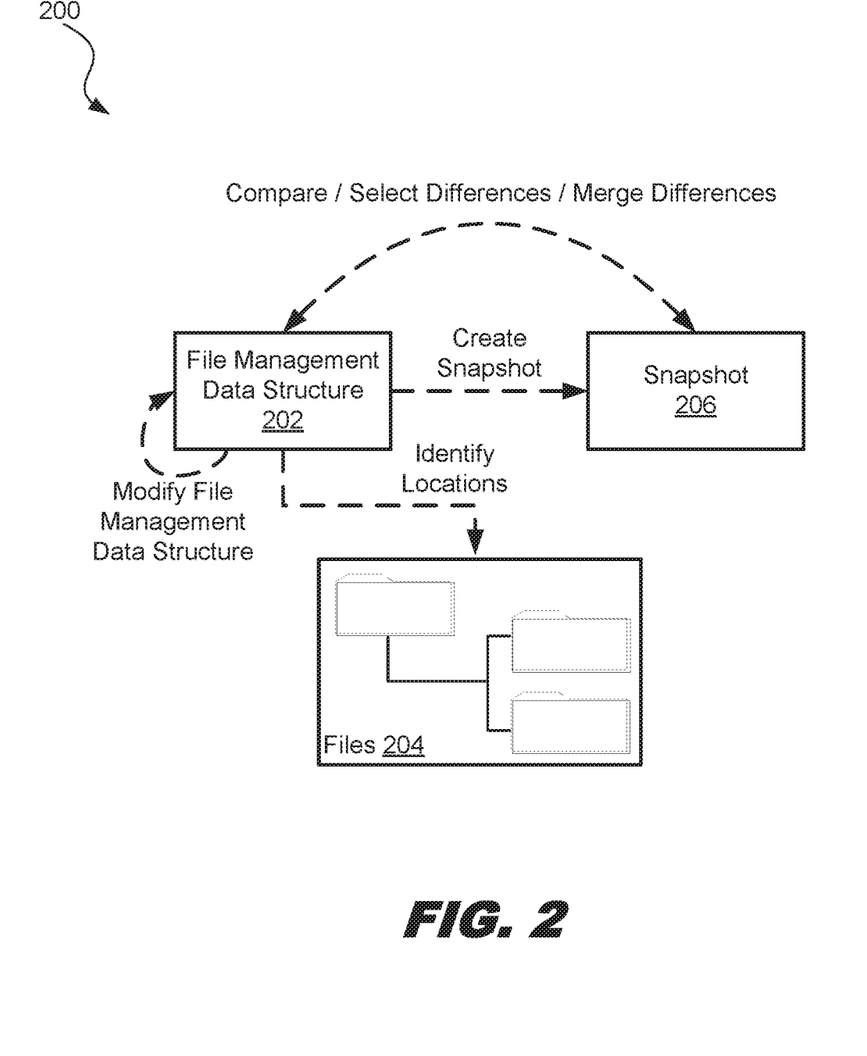
FIG. 2 is an organizational diagram illustrating operations performed on a file system 200, in accordance with various examples of the present disclosure.

FIG. 2 is an organizational diagram illustrating operations performed on a file system 200, in accordance with various examples of the present disclosure.

In the present example, the file system 200 is structured with a file management data structure 202 that provides information corresponding to files 204. The file management data structure 202 is structured with at least one file entry for each file of the files 204.

In the present example, each file entry in the file management data structure 202 includes a pointer to a memory location where the file is stored. In some examples, the pointer identifies a first sector corresponding to the particular file. Each file entry in the file management data structure 202 may further specify other information in addition to the location information for the files 204. In some examples, the additional information for a file includes a file name, a file size, ownership and permissions attributes, relative location of the file within a directory hierarchy, and temporal information (e.g., last accessed timestamp, modification timestamp, creation timestamp, and so forth).

A computing device updates the file system 200 to create new files, delete existing files, and modify existing files. For example, a computing device may delete a file by removing a file entry for the file from the file management data structure 202. Accordingly, a pointer to a location of the file may be removed from the file management data structure 202. In another example, a computing device may add a new file entry for a newly created file. The new file entry may include a pointer to the location in memory where the newly created file is stored. In yet another example, a computing device may update a file by updating the content of the file in memory, as well as by updating the corresponding file entry for the file in the file management data structure 202. While each of the files 204 is described above as corresponding to a file entry in the file management data structure, in other examples the file management data structure 202 may include multiple data structures that have file entries corresponding to the files 204. Accordingly, each of the files may be associated with multiple file entries.

The snapshot 206 is structured as a copy of at least a portion of the file management data structure 202 at a particular point in time. In the present example, the file entries of the file management data structure 202 are copied to the snapshot 206 to create the snapshot 206. The snapshot 206 may include a copy of the file entry for each of the files 204. Each copied file entry may include information for a file such as a file name, pointer to a location of the file in memory, a file size, ownership and permissions attributes, relative location of the file within a directory hierarchy, and temporal information.

A computing device may compare information from the file management data structure 202 with information in the snapshot 206 to identify file differences, such as deleted files, added files, and/or modified files. These differences may be identified by comparing the file entries. The computing device may provide a graphical user interface (GUI) or command line interface (CLI) interface that displays to a user the differences between the file management data structure 202 and the snapshot 206. The user may then select differences for merging the differences from the file management data structure 202 to the snapshot 206 or from the snapshot 206 to the file management data structure 202. For example, a user may cherry-pick specific differences via a GUI or CLI to selectively update the snapshot 206 and/or file management data structure 202. In other examples, a user may select an option via a GUI or CLI to merge all differences from the file management data structure 202 to the snapshot 206 or from the snapshot 206 to the file management data structure 202.

Figure 3:
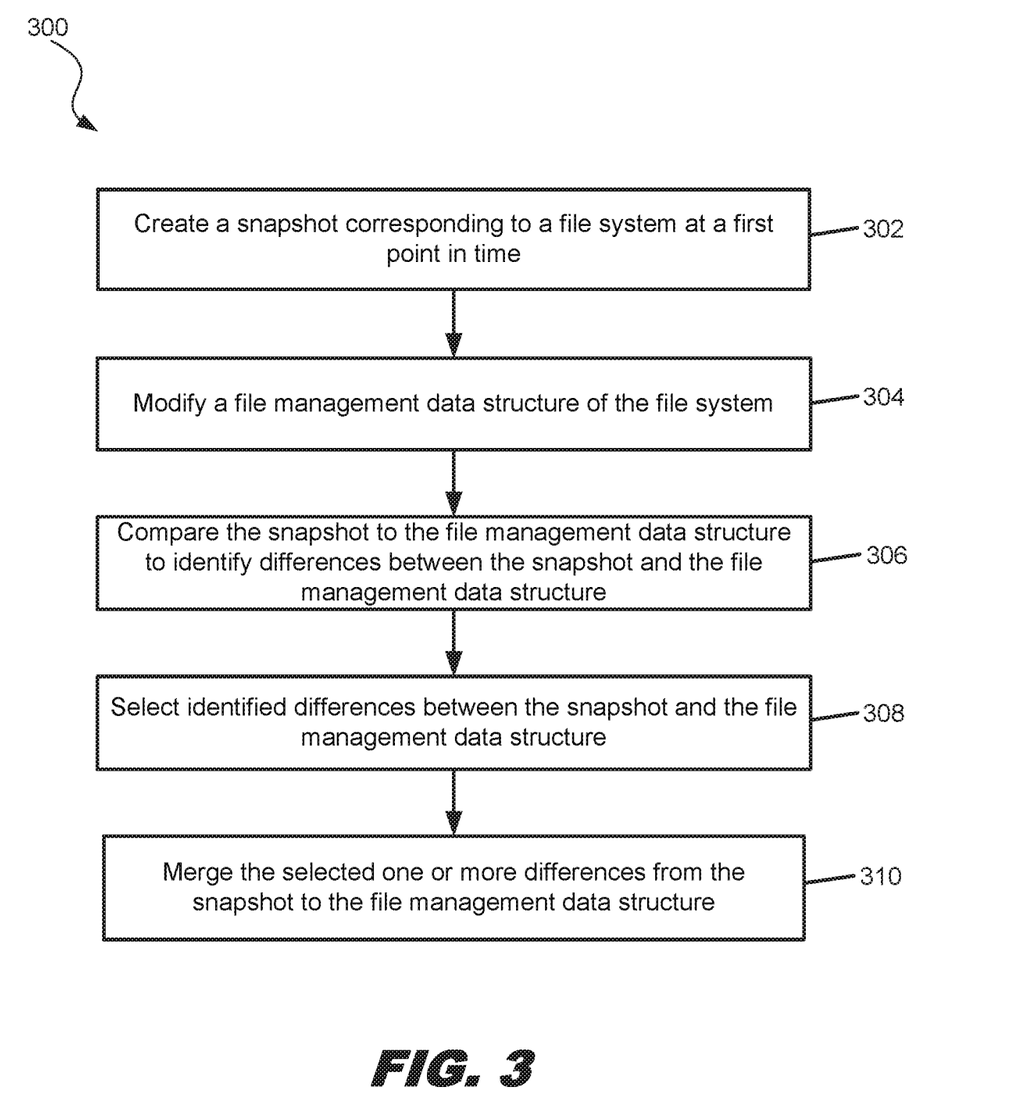
FIG. 3 is a flow diagram illustrating a method for merging differences between a snapshot and a file management data structure, in accordance with various examples of the present disclosure.

FIG. 3 is a flow diagram illustrating a method 300 for merging differences between a snapshot and a file management data structure, in accordance with various examples of the present disclosure. In the present example, actions may be performed by one or more processors executing instructions that are stored on computer-readable storage media, such as a non-transitory computer-readable storage medium. In some examples, the order of the actions may be performed according to alternative orderings, additional actions may be added, and/or actions may be removed.

At action 302, a computing device creates a snapshot of a file system at a first point in time. In the present example, the snapshot is created by copying at least a portion of data from a file management data structure, such as an active file table. The copy of the data from the file management data structure is stored in memory as a snapshot. This copy of the data includes, in some examples, location information corresponding to files that are stored in the file system. The computing device may copy the location information from the file management data structure by copying pointers to the files from the file management data structure to the snapshot. The snapshot may also include other information copied from the file management data structure, such as file names, attributes corresponding to the files, directory information, and so forth.

Each snapshot created by the computing device may be associated with metadata, such as a timestamp or version number so that the snapshots may be distinguished from one another. For example, a computing device may provide versioning by associating a first snapshot with a first version number and associating a second snapshot taken at a later time with a second version number.

In some examples, the computing device uses the versioning and/or timestamp information to maintain a hierarchy corresponding to the snapshots. For example, the computing device may create a snapshot tree that orders the snapshots relative to other snapshots. Snapshots may branch from the file management data structure or other snapshots. Accordingly, snapshots may be arranged/ordered relative to other snapshots and/or the file management data structure. Examples of arranging/ordering of the snapshots include ordering the snapshots in a tree to indicate parent and child relationship and sequential ordering based on timestamps.

At action 304, the computing device modifies the file management data structure of the file system. In the present example, the computing device may create a new file, delete an existing file, or modify an existing file. The computing device modifies the file management data structure to perform these changes to the file system. For example, the computing device may delete a file by removing a pointer to the file from the file management data structure. In another example, the computing device may create a file by inserting a pointer to a new file into the file management data structure. In yet another example, the computing device may modify the contents of a file in a data region and also modify the file management structure to store an updated file size, updated location, updated last modified time, and/or other updated file information.

At action 306, a user selects a particular snapshot of one or more snapshots to compare with the file management data structure. In some examples, a user may browse a listing or tree that includes the snapshots to make a selection using a GUI. In other examples, a user may list snapshots and input a selection of particular snapshot via a CLI. In yet other examples, the selection of a snapshot for comparison with the file management data structure may be performed without a user selection, such as by the computing device making a snapshot selection based on pre-configured or determined criteria. For example, based on detecting a fault, a computing device may automatically compare the file management data structure with a most recent snapshot as part of a file system restoration process.

In the present example, the comparing of the selected snapshot and the file management data structure includes comparing the data stored in the file management data structure, such as file entries, with the data stored in the selected snapshot. This compared data may include file names, pointers to the locations in the data region where the files are stored, file attributes, and so forth. The comparison identifies differences, such as pointers that exist in a snapshot that do not exist in the file management data structure, pointers that exist in the file management data structure that do not exist in the snapshot, and/or differences between pointers that are stored in both the file management data structure and the snapshot. Differences between the pointers may be, for example, memory address locations referenced by the pointers. For example, the snapshot may include a pointer that identifies a particular file as being located at a particular sector, while the file management data structure may include a pointer that identifies the particular file as being located at a different sector.

Other differences between the snapshot and the file management data structure may also be identified, such as differences in the metadata corresponding to the files. For example, the snapshot may include file attributes for a file that specify permissions, modification time, and so forth, which may be compared to file attributes of a file management data structure to identify differences. Further, information corresponding to a directory hierarchy and locations of files within the directory hierarchy may also be stored in the snapshots and file management data structure. The computing device may also compare this information to identify differences.

At action 308, a user selects one or more of the identified differences between the file management data structure and the snapshot. This selection may include cherry-picking particular differences from among a list of a plurality of differences. The selection may also include selecting all of the differences. For example, a user may select an option to merge all differences from the snapshot to the file management data structure or from the file management data structure to the snapshot. In some examples, the selecting is performed via a GUI or CLI interface that organizes the differences based on file name, type of difference (e.g., new file, deleted file, modified file), or other criteria. Differences may further be color-coded or have other indications that may assist a user with distinguishing between types of differences. In some examples, the selecting of differences may be performed automatically, without user selection. For example, the computing device may select all differences by default or the computing device may select corrupted or missing files to restore from the snapshot.

At action 310, the computing device merges the selected differences from the snapshot to the file management data structure. Differences may be merged by copying data from the snapshot to the file management data structure. For example, the selected differences may correspond to one or more file entries that exist in the snapshot, but that do not exist in the file management data structure. These differences may be merged into the file management data structure by copying file pointers corresponding to the missing file entries from the snapshot to the file management data structure. These file entries may correspond to files that were previously deleted by removing the pointers to the files from the file management data structure, while leaving the content of the files intact in the data region. Accordingly, by copying the file pointers from the snapshot to the file management data structure, the file management data structure may then identify the locations of the files in the data region so that the files may be accessed. In addition, metadata corresponding to the files may also be copied from the snapshot, such as information corresponding to file attributes, relative locations of the files in a directory hierarchy, and so forth.

In another example, a merged difference may correspond to a file entry that is identified in the file management data structure, but that is identified as not existing in the snapshot. Accordingly, the difference may be merged to the file management data structure by removing any pointers and other file metadata corresponding to the file entry from the file management data structure.

In yet another example, a merged difference may correspond to a modified file entry. The modifications may, for example, include changed file attributes, changed file content, or changed file location. Accordingly, the difference may be merged into the file management data structure by copying an updated memory address corresponding to the file into a pointer for the file in the file management data structure, copying the modified attributes from the snapshot to the file management data structure, and so forth.

While the examples above describe merging file pointers and metadata from a snapshot to the file management data structure, in other examples, selected differences may be merged from the file management data structure to a snapshot using similar techniques. For example, file pointers and other file information may be copied from the file management data structure to a snapshot to rebase the snapshot.

Figure 4:
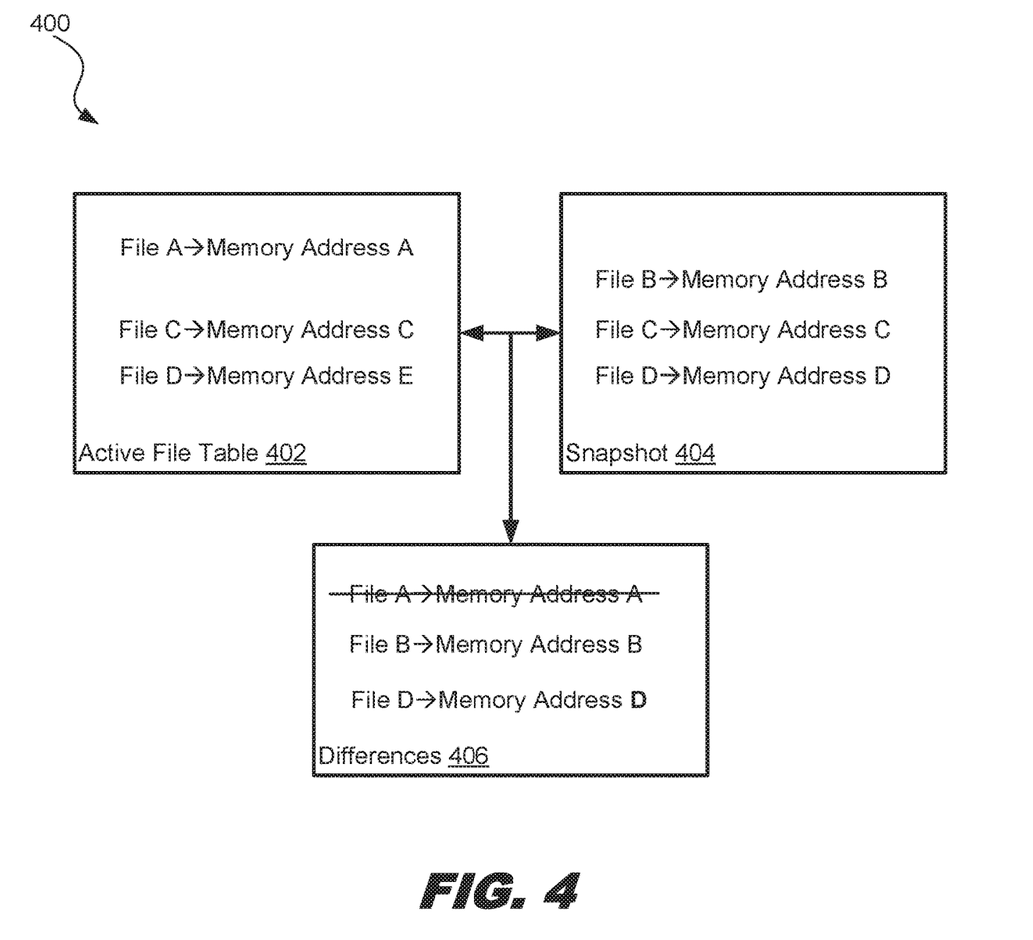
FIG. 4 is an organizational diagram illustrating differences between an active file table and a snapshot, in accordance with various examples of the present disclosure.

FIG. 4 is an organizational diagram illustrating differences between an active file table and a snapshot in a snapshot versioning system 400, in accordance with various examples of the present disclosure.

The system 400 includes an active file table 402, which is one type of file management data structure. Other data structures may be used to store file data instead of or in addition to the active file table 402. The active file table 402 stores information corresponding to files at the present time and is updated to reflect the most recent updates to the files. The active file table 402 is structured to include rows and columns that store file entries corresponding to the files. These file entries include, for each file, a pointer to a memory address where the file is stored. In this example, the active file table 402 includes pointers that identify that File A is located at Memory Address A, File C is located at Memory Address C, and File D is located at Memory Address E.

The system 400 includes a snapshot 404, which in this example is structured to include a similar data structure format as the active file table 402. For example, the snapshot 404 may be created by copying the entirety or a portion of the active file table 402 at a particular point in time. In other examples, the snapshot 404 may be stored in a compressed, encrypted, or otherwise altered data format. In the present example, the snapshot 404 includes file entries that include pointers that identify locations of files. In this example, the snapshot 404 includes pointers that identify that File B is located at Memory Address B, File C is located at Memory Address C, and File D is located at Memory Address D.

The system 400 identifies differences 406 by comparing the active file table 402 with the snapshot 404. These differences include an identification that the File A pointer does not exist in the snapshot 404, that the File B pointer does not exist in the Active File Table 402, and that the snapshot 404 specifies Memory Address D for File D, rather than Memory Address E. These differences may be selected by a user or by a computing device automatically to either cherry-pick some differences or to select all of the differences.

The selected differences may be merged from the snapshot 404 to the active file table 402 to restore the active file table 402 to a previous state. The selected differences may be merged from the active file table 402 to the snapshot 404 to rebase the snapshot 404 to include modifications made to the active file table 402 after taking the snapshot 404.

Differences may be merged to the active file table 402 by updating the active file table 402 to replace information in the active file table 402 or update the active file table 402 information to include information from the snapshot 404. Similarly, differences may be merged to the snapshot 404 by updating the snapshot 404 to replace information in the snapshot 404 or update the snapshot 404 information to include information from the active file table 402.

As an example, to merge the differences 406 into the active file table 402, the File A pointer may be removed from the active file table 402, the File B pointer may be added to the active file table 402, and the pointer for File D may be updated in the active file table 402 to reference Memory Address D. While this example identifies file pointer differences, these techniques may also be used to select and merge other differences between snapshots and a file management data structure, such as file attribute and directory hierarchy differences. These other differences may also be merged by copying the differences from the active file table 402 to the snapshot 404 or by copying the differences from the snapshot 404 to the active file table 402. Further while these differences are discussed with reference to files, similar techniques may also be used to select and merge directory information or other information maintained by an active file table 402 or other file management data structure (e.g., a directory tree).

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure. Although illustrative examples have been shown and described, a wide range of modification, change and substitution is contemplated in the foregoing disclosure and in some instances, some features of the examples may be employed without a corresponding use of other features. In some instances, actions may be performed according to alternative orderings. One of ordinary skill in the art would recognize many variations, alternatives, and modifications. Thus, the scope of the invention should be limited only by the following claims, and it is appropriate that the claims be construed broadly and in a manner consistent with the scope of the examples disclosed herein.

What is claimed is:

1. A method comprising:
    creating a snapshot corresponding to a file system at a first point in time;
    modifying a file management data structure of the file system, wherein the file management data structure includes an active file table that identifies locations in memory of files of the file system, wherein the active file table stores information corresponding to files at a present time and is updated to reflect updates to the files;
    identifying differences between the snapshot and the file management data structure by comparing the snapshot to the active file table, wherein at least one of the identified differences includes: a snapshot pointer that exists in the snapshot and does not exist in the active file table, an active file table pointer that exists in the active file table and does not exist in the snapshot, or at least one pointer difference between a pointer that is stored in both the snapshot and the active file table;
    displaying, via a graphical user interface (GUI) or a command line interface (CLI), the identified differences;
    selecting, via the graphical user interface (GUI) or the command line interface (CLI), a subset of the identified differences between the snapshot and the file management data structure; and
    merging the selected subset of the identified differences from the snapshot to the file management data structure, wherein the selected subset of the identified differences is merged from the snapshot to the active file table.

2. The method of claim 1, wherein the active file table reflects the state of the file system at a current point in time, and wherein the active file table stores a pointer corresponding to a file of the file system, and wherein the pointer identifies a memory address corresponding to the file.

3. The method of claim 1, wherein creating the snapshot comprises:
    storing a copy corresponding to the file management data structure at the first point in time; and
    associating temporal information with the copy, the temporal information selected from the group consisting of: a time, a date, and a version.

4. The method of claim 1, wherein modifying the file management data structure comprises one or more operations selected from the group consisting of: removing an existing pointer corresponding to a deleted file; adding a new pointer corresponding to a new file; and
    updating a memory address of a pointer corresponding to a modified file.

5. The method of claim 1, wherein merging the selected one or more differences comprises at least one operation selected from the group consisting of: copying a pointer from the snapshot to the file management data structure, modifying an existing pointer of the file management data structure to include a memory address of a pointer from the snapshot, and deleting an existing pointer of the file management system that does not exist in the snapshot.

6. The method of claim 1, wherein the selected one or more differences include all of the identified differences.

7. The method of claim 1, the method further comprising:
    selecting at least one snapshot;
    determining differences between the at least one selected snapshot and the file management data structure; and
    merging the determined differences from the file management data structure to the at least one selected snapshot.

8. A non-transitory machine-readable medium having stored thereon machine-readable instructions executable to cause a machine to perform operations comprising:
    creating a snapshot corresponding to a file system at a first point in time;
    modifying a file management data structure of the file system, wherein the file management data structure includes an active file table that identifies locations in memory of files of the file system, wherein the active file table stores information corresponding to files at a present time and is updated to reflect updates to the files;

identifying differences between the snapshot and the file management data structure by comparing the snapshot to the active file table, wherein at least one of the identified differences includes: a snapshot pointer that exists in the snapshot and does not exist in the active file table, an active file table pointer that exists in the active file table and does not exist in the snapshot, or at least one pointer difference between a pointer that is stored in both the snapshot and the active file table;

displaying, via a graphical user interface (GUI) or a command line interface (CLI), the identified differences;

selecting, via the graphical user interface (GUI) or the command line interface (CLI), a subset of the identified differences between the snapshot and the file management data structure; and merging the selected subset of the identified differences from the snapshot to the file management data structure, wherein the selected subset of the identified differences is merged from the snapshot to the active file table.

9. The non-transitory machine-readable medium of claim 8, wherein the active file table reflects the state of the file system at a current point in time, and wherein the active file table stores a pointer corresponding to a file of the file system, and wherein the pointer identifies a memory address corresponding to the file.

10. The non-transitory machine-readable medium of claim 8, wherein creating the snapshot comprises:
storing a copy corresponding to the file management data structure at the first point in time; and
associating temporal information with the copy, the temporal information selected from the group consisting of: a time, a date, and a version.

11. The non-transitory machine-readable medium of claim 8, wherein modifying the file management data structure comprises one or more operations selected from the group consisting of: removing an existing pointer corresponding to a deleted file; adding a new pointer corresponding to a new file; and updating a memory address of a pointer corresponding to a modified file.

12. The non-transitory machine-readable medium of claim 8, wherein merging the selected one or more differences comprises at least one operation selected from the group consisting of: copying a pointer from the snapshot to the file management data structure, modifying an existing pointer of the file management data structure to include a memory address of a pointer from the snapshot, and deleting an existing pointer of the file management system that does not exist in the snapshot.

13. The non-transitory machine-readable medium of claim 8, the operations further comprising:
selecting at least one snapshot;
determining differences between the at least one selected snapshot and the file management data structure; and
merging the determined differences from the file management data structure to the at least one selected snapshot.

14. A system comprising:
a non-transitory memory;
one or more hardware processors coupled to the non-transitory memory that read instructions from the non-transitory memory to cause the system to perform operations comprising:
creating a snapshot corresponding to a file system at a first point in time;
modifying a file management data structure of the file system, wherein the file management data structure includes an active file table that identifies locations in memory of files of the file system, wherein the active file table stores information corresponding to files at a present time and is updated to reflect updates to the files;
identifying differences between the snapshot and the file management data structure by comparing the snapshot to the active file table, wherein at least one of the identified differences includes: a snapshot pointer that exists in the snapshot and does not exist in the active file table, an active file table pointer that exists in the active file table and does not exist in the snapshot, or at least one pointer difference between a pointer that is stored in both the snapshot and the active file table;
displaying, via a graphical user interface (GUI) or a command line interface (CLI), the identified differences;
selecting, via the graphical user interface (GUI) or the command line interface (CLI), a subset of the identified differences between the snapshot and the file management data structure; and
merging the selected subset of the identified differences from the snapshot to the file management data structure, wherein the selected subset of the identified differences is merged from the snapshot to the active file table.

15. The system of claim 14, wherein the active file table stores a pointer corresponding to a file of the file system, and wherein the pointer identifies a memory address corresponding to the file.

16. The system of claim 14, wherein creating the snapshot comprises:
storing a copy corresponding to the file management data structure at the first point in time; and
associating temporal information with the copy, the temporal information selected from the group consisting of: a time, a date, and a version.

17. The system of claim 14, wherein modifying the file management data structure comprises one or more operations selected from the group consisting of: removing an existing pointer corresponding to a deleted file; adding a new pointer corresponding to a new file; and
updating a memory address of a pointer corresponding to a modified file.

18. The system of claim 14, wherein merging the selected one or more differences comprises at least one operation selected from the group consisting of: copying a pointer from the snapshot to the file management data structure, modifying an existing pointer of the file management data structure to include a memory address of a pointer from the snapshot, and deleting an existing pointer of the file management system that does not exist in the snapshot.

19. The system of claim 14, the operations further comprising:
selecting at least one snapshot;
determining differences between the at least one selected snapshot and the file management data structure; and
merging the determined differences from the file management data structure to the at least one selected snapshot.

20. The method of claim 1, further comprising ordering the snapshot in a tree relative to at least one other snapshot to maintain a snapshot hierarchy.

* * * * *